Oct. 12, 1948.   M. WATTER   2,451,454
METHOD OF FABRICATING AIRFOILS
Filed June 28, 1943   7 Sheets-Sheet 1
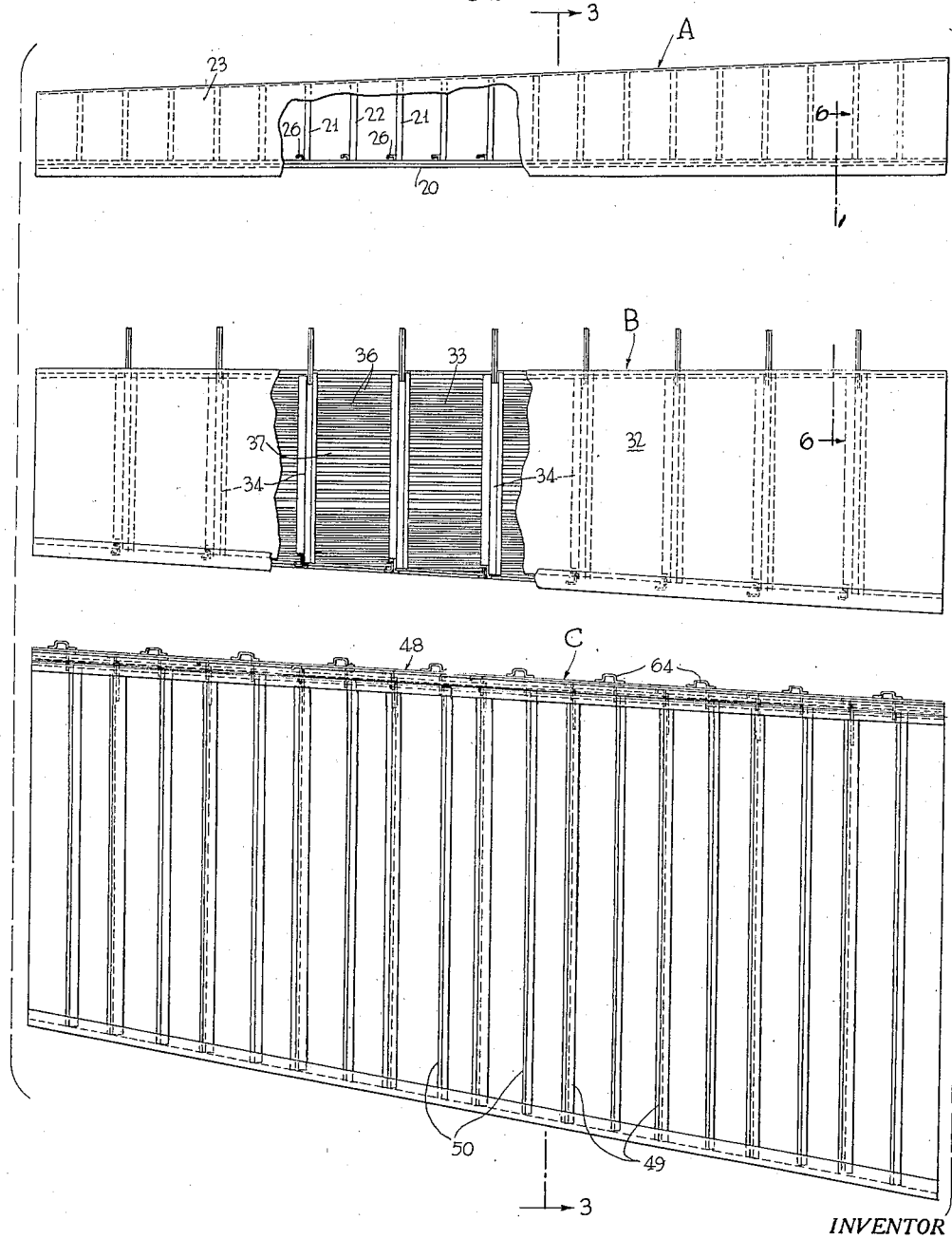
INVENTOR
Michael Watter.
BY John P. Barby
ATTORNEY

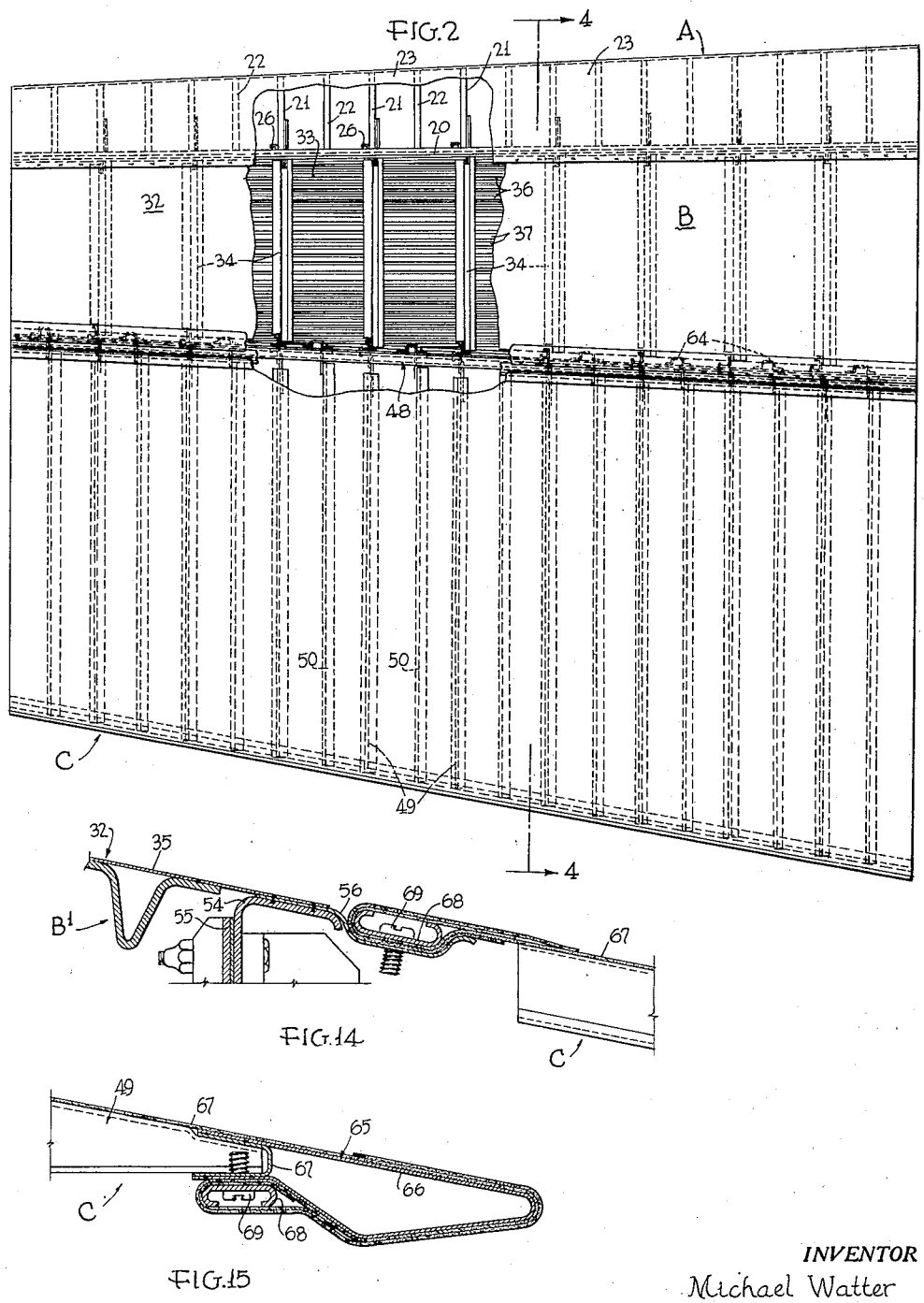

Oct. 12, 1948.   M. WATTER   2,451,454
METHOD OF FABRICATING AIRFOILS
Filed June 28, 1943   7 Sheets-Sheet 3
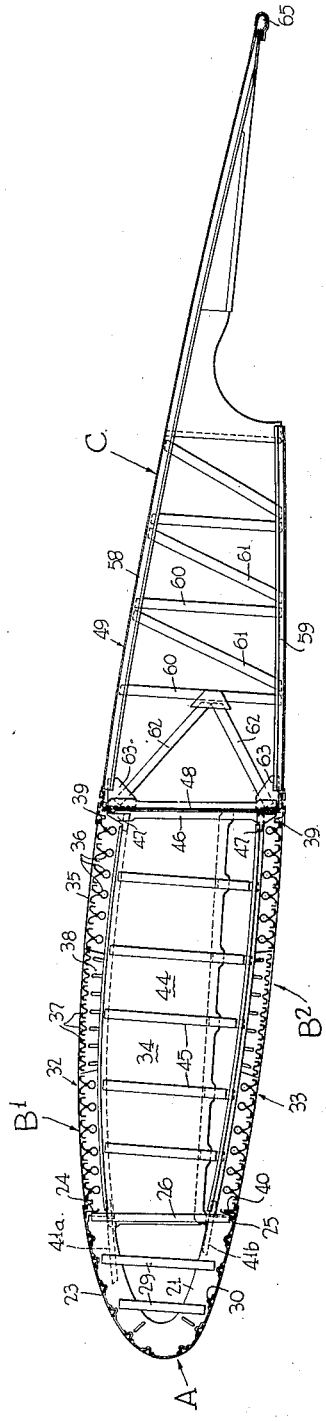
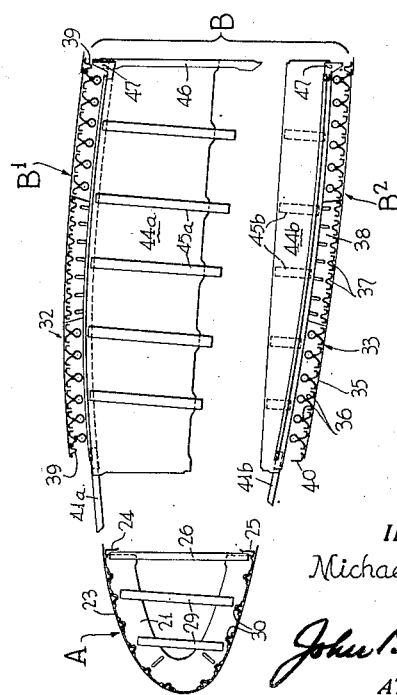
INVENTOR
Michael Watter
ATTORNEY

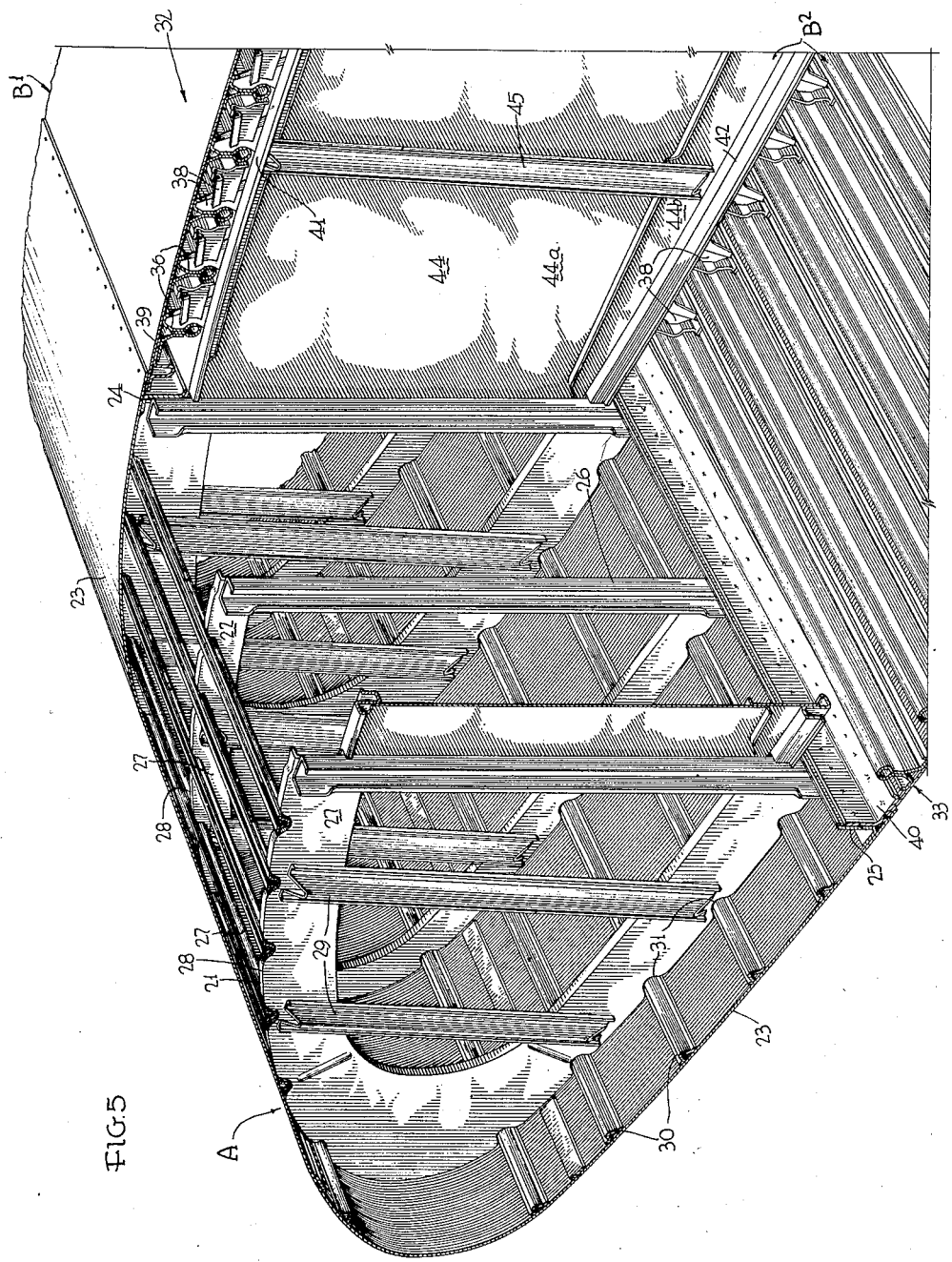

Oct. 12, 1948. M. WATTER 2,451,454
METHOD OF FABRICATING AIRFOILS
Filed June 28, 1943 7 Sheets-Sheet 5
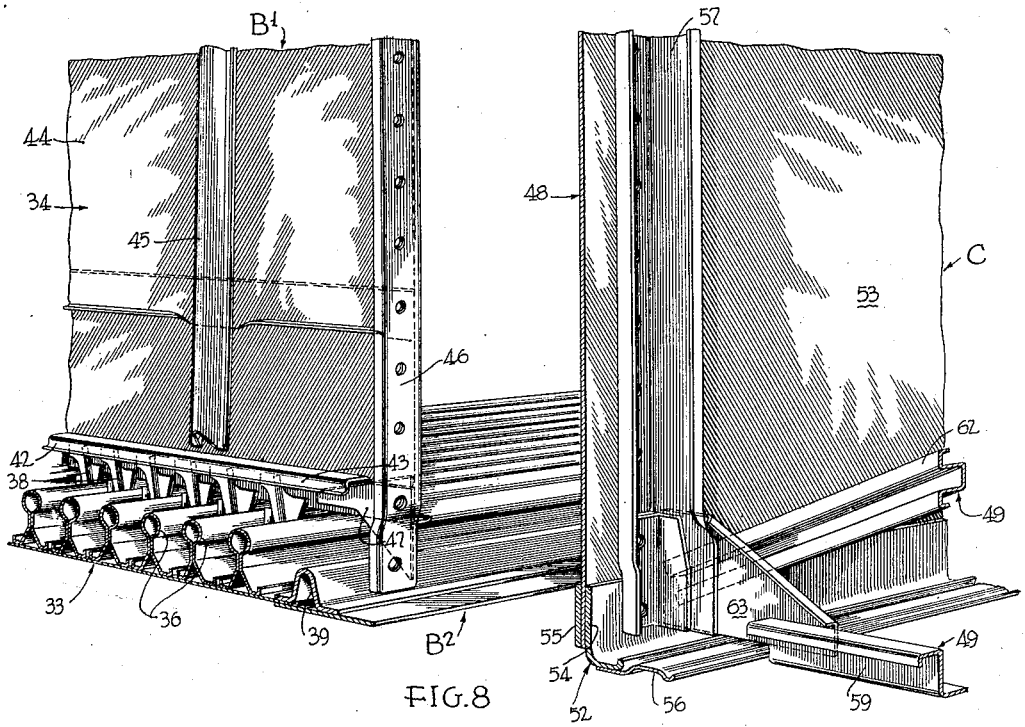
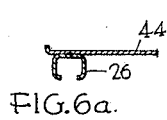
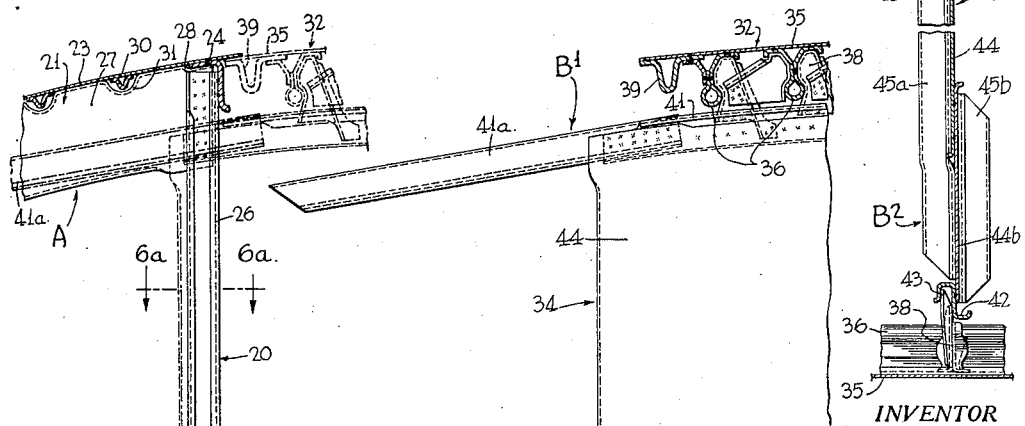
INVENTOR
Michael Watter
BY
ATTORNEY Oct. 12, 1948.    M. WATTER    2,451,454
METHOD OF FABRICATING AIRFOILS
Filed June 28, 1943    7 Sheets-Sheet 6

INVENTOR
Michael Watter.
BY John P. Barbor
ATTORNEY

Oct. 12, 1948.   M. WATTER   2,451,454
METHOD OF FABRICATING AIRFOILS
Filed June 28, 1943   7 Sheets-Sheet 7

INVENTOR
Michael Watter.
BY John P. Parker
ATTORNEY

Patented Oct. 12, 1948

2,451,454

UNITED STATES PATENT OFFICE 2,451,454

METHOD OF FABRICATING AIRFOILS

Michael Watter, Philadelphia, Pa., assignor to The Budd Company, Philadelphia, Pa., a corporation of Pennsylvania Application June 28, 1943, Serial No. 492,492

5 Claims. (Cl. 29—148.2)

The invention relates to sustaining airfoils or the like, such as aircraft wings of the stressed metal skin type, and particularly to a method of fabrication and assembly of such airfoils.

A difficulty in the construction and assembly of such airfoils has in most cases heretofore resided in the fact that, if the entire width of the airfoil was assembled in a main assembly jig, the parts were in many cases difficult of access to perform the joining operations, and the number of workmen who could work on a given airfoil was limited and the workmen were liable to get in each other's way, all of which interfered with the expeditious fabrication and assembly of the airfoil structure.

Various schemes have been proposed to avoid these difficulties but none of them, to applicant's knowledge, has facilitated the fabrication and assembly of the parts entering into the airfoil structure to the degree which is proposed in the improvements forming the subject of the present application.

It is an object of the invention to facilitate the construction and assembly of an airfoil of this type, particularly when the parts are largely constructed of a high tensile material such as stainless steel, and joined together in major part by spot welding operations, whereby to give the resulting airfoil a high strength-weight ratio.

To this end, the parts entering into the airfoil structure are preassembled into a number of convenient subassemblies along lines of division which facilitate their assembly in subassembly and also in the final assembly, leaving for the final assembly a comparatively few joining operations, which can be readily performed in a main assembly jig by a relatively small number of workmen.

According to the invention, the main structure of the airfoil is fabricated in preassembly into three main subassemblies, namely, a nose or front spar subassembly comprising a front open spar, nose rib sections and a skin covering, an intermediate or central section subassembly comprising top and bottom skin blankets interconnected by rib sections (this subassembly being conveniently preassembled into top and bottom subassemblies, each including a skin blanket and portions of the rib sections), and a trailing edge subassembly including the rear or main spar and trailing edge ribs.

The nose subassembly and the intermediate subassembly or subassemblies are each formed with overlapping final assembly joint formations through which they can be readily joined together in final assembly by reaching in between the top and bottom skin subassemblies from their open rear side unobstructed by a rear spar. The trailing edge subassembly including the rear or main spar can then be brought up and, through convenient final assembly joint structures provided on the intermediate subassembly and the spar of the trailing edge subassemblies, secured together to form the complete width of the airfoil structure. Access is readily had to make this final assembly joint because the trailing edge subassembly, which carries relatively light loading, is not covered by a metal skin, but is covered only, after the structural assembly has been made as hereinbefore indicated, by a usual fabric covering.

The construction and method of assembly according to the invention is particularly convenient and efficient where the parts are, as in this embodiment, joined in large part by spot welding operations. The rear spar is, however, preferably bolted onto the intermediate subassembly, since it is desirable to make it of simple shear web construction leaving no weakening openings therein, thus facilitating the fabrication of the spar and, at the same time, affording it a high strength-weight-ratio.

Other and further objects and advantages and the manner in which they are attained will become apparent from the following detailed description when read in connection with the drawings forming a part of this specification.

In the drawings:

Fig. 1 is an exploded plan view, parts being broken away, of the three main subassemblies entering into the structure of the inner wing panel fabricated in accordance with the invention;

Fig. 2 is a similar view showing the subassemblies of Fig. 1 joined together and the fabric covering applied to the trailing edge subassembly to form the completed wing panel;

Fig. 3 is an exploded chordwise vertical sectional view of the wing panel on a somewhat enlarged scale showing the main subassemblies entering into the final structure;

Fig. 4 is a similar sectional view with the subassemblies of Fig. 3 joined together and the fabric covering applied to the trailing edge subassembly;

Fig. 5 is an enlarged perspective view showing the detail of the leading edge construction and the manner of joinder of the central section subassembly or subassemblies to the leading edge subassembly;

Fig. 6 is a fragmentary chordwise sectional view through the upper part of the joint between the leading edge subassembly and the central top skin blanket and rib subassembly, the joint parts being shown in full lines in spaced apart relation and in dotted lines in joined relation;

Fig. 6a is a detail section of the joint taken substantially along the line 6a—6a of Fig. 6;

Fig. 7 is a spanwise vertical sectional view partly broken away through the central section of the wing panel in the region adjacent a spar after the final assembly of the two subassemblies entering into the structure of this section;

Fig. 8 is an exploded perspective view, on an enlarged scale, of the lower portions of joint parts entering into the final assembly joint structure between the central section subassembly and the trailing edge subassembly;

Figures 10, 11, 12, 13:
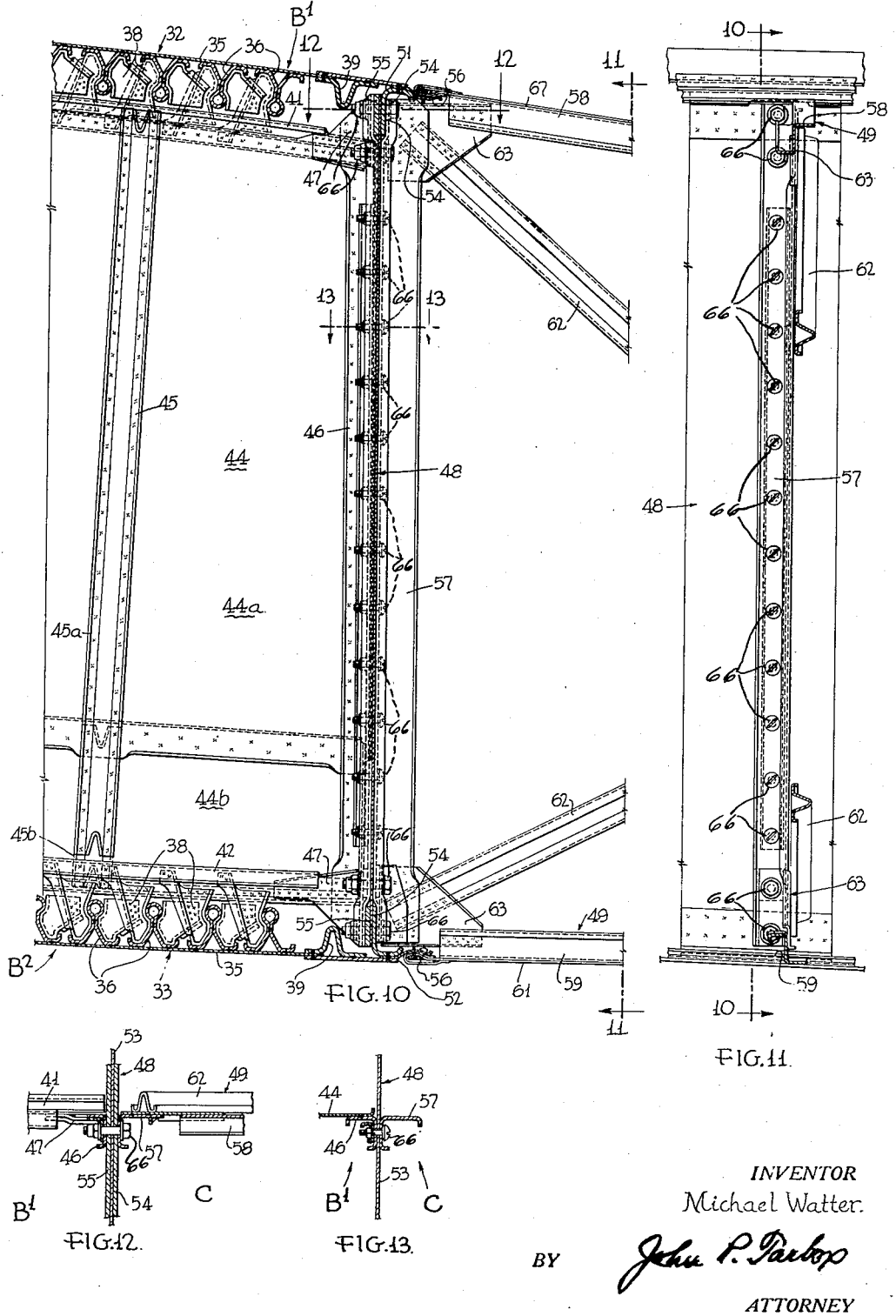
Fig. 10 is a similar sectional view showing the final assembly of the subassemblies shown separated in Fig. 9, and also showing the fabric covering applied to the trailing edge structure, the section being taken substantially along the line 10—10 of Fig. 11.
Fig. 11 is a fragmentary spanwise vertical sectional view through the wing panel as seen when looking in the direction of the arrows at the end of the section line 11—11 of Fig. 10.

Figs. 12 and 13 are detail sectional views taken respectively along the lines 12—12 and 13—13 of Fig. 10; and Figs. 14 and 15 are detail sectional views, on an enlarged scale, showing the manner of attachment of the top fabric covering at front and rear margins, respectively, of the trailing edge structure.

In the drawings, the invention has been shown applied to the fabrication of the inner wing panel of a cantilever wing of an airplane, which panel is usually secured to the fuselage either directly or through stub wings projecting therefrom or otherwise.

Referring to Fig. 1, it will be seen that the wing panel structure for its entire length may be prefabricated into three main subassemblies before it is brought to the final assembly jig. The three main subassemblies are the nose or leading edge or front spar subassembly, designated generally by the letter A, the intermediate or central section subassembly, designated generally by B, and the trailing edge subassembly designated generally by C.

For additional convenience in assembly, the central section subassembly B may be prefabricated in two, upper and lower, subassemblies B¹ and B², as shown in Fig. 3, these two subassemblies being preferably brought together and joined to form the full depth central section subassembly B before the latter is joined in final assembly to the subassemblies A and C. However, these two subassemblies B¹ and B² may alternatively be brought into final assembly relation with the nose subassembly A and with each other in the final assembly jig before being joined together, and the entire operation of joining them together and to the nose subassembly performed at the same time in the final assembly jig.

*The nose or leading edge or front spar subassembly*

The nose or front spar subassembly is preassembled in a separate jig or jigs and comprises, referring to Figs. 1, 2, 3, 4, 5, 6 and 6a, an open front spar or spar-like formation 20, spaced nose ribs 21 and 22 and a nose skin blanket 23. The entire front subassembly, in effect, constitutes a hollow spar. The spar 20 may comprise upper and lower angle-section chords 24 and 25, the main vertically extending arms of which are interconnected at spaced intervals corresponding to the position of the nose ribs by vertical struts 26, which are shown to be of channel cross section with one side wall thereof overlapping forward faces of said arms of the chords 24 and 25, and spot welded thereto.

The spar 20 is stiffened and strengthened by the nose ribs 21 and 22 and the skin blanket 23 secured thereto and to the spars. The nose ribs 21 and 22 are generally U-form web plates 27 flanged in their inner and outer margins, the outer margin conforming to the nose contour. At the rear ends of the plates 27, see Fig. 5, their body portions overlap the vertical struts 26 and are welded thereto, while their outer flanges 28 are slightly offset inwardly and overlap the forwardly extending arms of the spar chords 24 and 25, and are welded thereto in the overlap.

The nose ribs are further stiffened by a pair of spaced vertical stiffeners, as 29, of generally hat-section extending between the upper and lower arms of the U and secured to these arms.

It may be noted here that the alternate nose ribs 21 and 22 differ from each other mainly in the fact that the ribs 21 are made heavier than ribs 22, having deeper web plates which serve as final assembly joint parts in the final assembly, and it is only the ribs 21 which form final assembly joints with the rib sections of the central subassembly B.

The thin metal skin sheet 23, conforming to the outer contour of the ribs 21 and 22, is seated on outer flanges 28 and spot welded thereto. To stiffen the sheet longitudinally it is reinforced on its inner face by parallel suitably spaced longitudinal stringers 30 of flanged channel section secured to the skin sheet through their flanges. Where these stringers 30 cross the ribs 21 and 22, the outer margins of the latter are recessed, as at 31, to accommodate them. The rear top and bottom margins of the skin sheet 23 overlap the forwardly extending flanges of the spar chords 24 and 25 and are spot welded thereto in the overlap and the margins of the sheet extend freely rearwardly beyond the vertical main arms of the spars, see Fig. 6, to form final assembly joint parts.

So constituted, the nose or front spar subassembly A comprises a strong beam structure stiff against bending and torsion stresses, and can be readily fabricated in subassembly and handled and shipped as a unit ready for the final assembly operations.

*The intermediate or central section subassembly*

For convenience of fabrication, the central section subassembly B is preferably, as shown in Fig. 3, first preassembled into separate upper and lower subassemblies B¹ and B² each extending the length of the panel. This central section subassembly B comprises, as shown in Figs. 1, 2, 3, 4, 5, 8 and 9, top and bottom skin blankets 32 and 33 interconnected at spaced intervals corresponding to the spacing of nose ribs 21 by central rib sections 34. These rib sections as well as the nose ribs may vary in different portions of the panel span, the ribs shown being taken as typical.

Each skin blanket may be constructed as more fully disclosed and claimed in copending application Serial No. 492,495, filed June 28, 1943, now abandoned, each comprising a thin metal skin sheet 35 heavily reinforced in regions adjacent its front and rear margins by deep and heavy stringers 36 of generally Y-bulb section and in the intermediate region by shallow, lighter stringers 37 of generally hat section. Both sets of stringers are strongly secured to the skin sheet, as by spot welding, and to the ribs by a shear transmitting clip structure designated generally by 38.

As shown, the skin sheet of the top blanket 32 is further reinforced in its front and rear margins, which are designed to provide final assembly joint parts, by a heavy flanged channel section stringer as 39. The margins of the skin sheet 35 of the bottom skin blanket 33 may be similarly reinforced, but in the case shown, the front margin, instead of being reinforced by a flanged channel section stringer 39 is reinforced by an angle 40 having one arm welded to the skin sheet and the other arm vertically extended to provide a final assembly joint part.

The typical rib section 34 for this central subassembly B may comprise top and bottom cap strips 41 and 42 of generally Z-cross section with the main web portion of the Z extending vertically and overlapped by the body of the clip structures 38 and secured thereto in the overlap. As shown in Fig. 7, the inner arms of the Z's of the cap strips are further flanged, as at 43, and certain of the clip structures are additionally secured to these flanges.

The cap strips of the rib section 34 conform generally to the airfoil contour and are interconnected by a shear web, designated generally by 44, overlapping in its top and bottom margins the vertical main web of the cap strips 41 and 42 and spot welded thereto in the overlap.

The rib section 34 is additionally reinforced by spaced vertical stiffeners 45 of generally hat section secured to the web 44 and at their upper and lower ends to the vertical webs of the cap strips 41 and 42. At its rear margin, the web 44 is strongly reinforced by a vertical strut 46 of generally angular section, see Figs. 12 and 13, having one arm secured to the web and its other arm extending laterally to form a final assembly joint part. The ends of the strut 46 are extended substantially to the top and bottom skin sheets 35 and are strongly secured in these end regions to the adjacent cap strip by direct overlap of the vertical web of the cap strip with and securement to the forwardly extending arm of the angle of the strut 46, and through a generous gusset, as 47, overlapping and welded to both the web of the cap strip as 41 or 42 and the arm of the strut 46, as clearly appears in Figs. 9, 10 and 12.

To facilitate the preassembly of the central section into upper and lower units B¹ and B² as shown in Figs. 3 and 7, the web 44 of the ribs 34 is divided into an upper portion 44a and a lower portion 44b which are preassembled with their respective cap strips and skin blankets and overlap in the final assembly and are secured together in the overlap. Similarly, each of the stiffeners as 45 is divided into an upper portion 45a and a lower portion 45b which likewise are preassembled with the respective upper and lower units B¹ and B² and overlap in final assembly and are secured together and to the web as by spot welding, as clearly appears in Figs. 7 and 10. However, the vertical rear strut 46, which extends continuously from top skin to bottom skin, is preassembled in entirety with the top subassembly B¹, as shown in Fig. 3. When the subassemblies B¹ and B² are finally assembled, the lower portion of strut 46 overlaps and is secured to the web portion 44b and to the bottom cap strip 42 and adjacent gusset 47 forming parts of the lower subassembly B² in the manner hereinbefore described.

Figure 9:
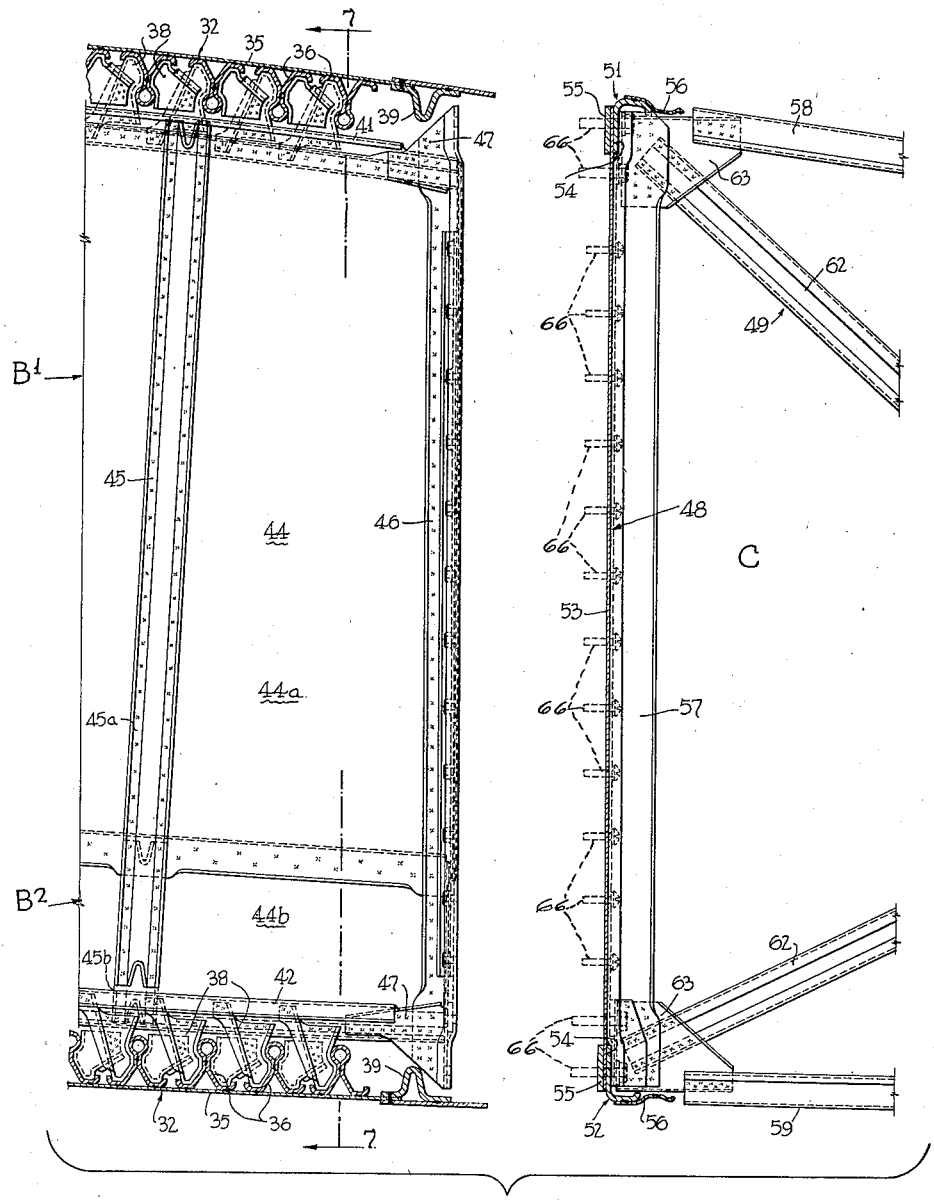
Fig. 9 is an exploded chordwise vertical sectional view on an enlarged scale, showing the full wing depth joint structure between the central section subassembly and the trailing edge subassembly.

At the rear the reinforced margins of the top and bottom skin blankets 33 and 34 are extended rearwardly beyond the web 44 and its marginal reinforcing strut 46 to form final assembly joint parts, see Figs. 3, 8 and 9.

At the front, see Figs. 3, 5 and 6, the web 44 is extended forwardly of the margins of the skin blankets to form a final assembly joint part and the top and bottom cap strips 41 and 42 are provided with forward extensions 41a and 42a which likewise provide final assembly joint parts.

*The trailing edge subassembly*

The trailing edge subassembly C comprises as a main element thereof the main or rear spar 48 which is constructed as a simple shear web extending from end to end of the panel. To the spar are attached at spaced intervals the main trailing edge ribs 49, which are preferably aligned with the main central rib sections 44, and the intermediate lighter trailing edge ribs, as 50.

The spar 48 may comprise top and bottom chords 51 and 52 interconnected by a web plate 53 of lighter gauge than the chords. Each of the chords 50 and 51 may comprise an angle, as 54, having a generally vertically extending arm overlapping and secured to the rear face of the web plate 53, the other arm of the angle extending generally rearwardly and forming a final assembly joint part. Opposite the angle 54 of each spar there is applied and secured to the web and angle a flat strip 55 of the same gauge as the angle and forming an element of the spar chords 51 and 52, respectively. Also secured to each of the rearwardly projecting arms of the angles 54 is a light gauge metal cover attaching strip 56.

As shown in Figs. 9, 10, 11, 12 and 13, the spar is reinforced in each of the regions of attachment of a main trailing edge rib 49 by a generally angular section vertically extending stiffener as 57 having its one arm applied to the rear face of the spar web 53 and secured thereto and its other arm projecting rearwardly for securement of the adjacent trailing edge rib 49. The laterally extending arm of this stiffener 57 is offset at its ends to overlap the arms of the chord angles 54 and forms with the web 53 and chords 51 and 52 of the spar a reinforced final assembly joint structure.

The trailing edge ribs 49 may be of any suitable construction fitting them to carry as cantilevers the bending load due to the mounting of the usual control surfaces, such as flaps, to the main spar 48. In this instance, they are shown, Figs. 3, 4, 9, 10 and 11, as comprising top and bottom chords 58 and 59 interbraced by vertical struts 60 and inclined struts 61 extending from a point adjacent the top of one vertical strut 60 to a point adjacent the next forwardly arranged such strut. The foremost vertical strut 60 is braced to the top and bottom spar chords by inclined struts 62 diverging from an intermediate portion of the said vertical strut to the top and bottom chords 51 and 52 of the spar 48.

As shown in Figs. 9, 10 and 11, the top and bottom chords 58 and 59 and the inclined struts 62 adjacent thereto are strongly connected to the top and bottom of the vertical stiffener 57, respectively, by gussets as 63.

The trailing edge portion of the trailing edge rib section may be provided with a recess in its lower portion to receive the usual flap. The construction of this trailing edge portion may conform with more or less conventional construction, consisting of a simple web plate interconnecting the top and bottom chords and similarly the alternate lighter ribs 50, not described in detail, may be of any conventional construction and may be secured to the spar in a manner similar to the connection of the main ribs 49. Obviously, they assist the main ribs 49 in carrying the loads to the spar 48.

As shown in Fig. 1, the spar web 53 may be reinforced on its forward face by vertical stiffeners as 64 in alignment with the lighter ribs as 50.

The rear margins of the trailing edge ribs 49 and 50 may all be interconnected by a marginal member 65, shown in the detail of Fig. 15 as comprised of two channel members 66 and 67, one 66 being a deep channel forming the extreme tip of the trailing edge. These channels are secured together through their side walls and to the ends of the ribs 49 and 50 as by spot welding.

*Assembly procedure*

With the subassemblies constituted as hereinbefore described, the assembly steps may be conveniently proceeded with somewhat as follows, although it will be understood that the precise procedure described in the following detailed description may be departed from in some instances without departing from the spirit and scope of the invention as defined in the claims.

The nose or front spar subassembly A is placed in the final assembly jig and the two subassemblies $B^1$ and $B^2$ constituting, when assembled with each other, the central section subassembly B, are either separately or in assembled relation brought up to the nose assembly, as most clearly indicated in Figs. 5, 6 and 6a, so that the final assembly joint parts on the respective subassemblies overlap. In this procedure, the front projecting portion of the web 44 of a central rib section 34 is brought into overlapping relation with the web 27 of the corresponding nose rib 21 and with the bottom wall of the corresponding vertical strut 26 of the front spar 20 and is secured thereto in the overlap, as by spot welding, see Figs. 6 and 6a. At the same time, the forward extensions 41a and 42a of the cap strips 41 and 42 of the central section rib 34 are also brought into overlapping relation with the web 27 of the corresponding nose rib and similarly secured thereto.

In this operation, the reinforced forward margin of the top skin sheet 35 of the central section B is lapped under the rearwardly projecting margin of the nose skin sheet 33, see Fig. 6, and is secured thereto in the overlap. The bottom skin sheet likewise has its margin reinforced by the angle 40, see Fig. 5, brought in overlapping relation with the rearwardly projecting bottom margin of the nose skin sheet and secured thereto. At the same time the vertical arm of angle 40 is brought into overlapping relation with the vertical arm of the front spar chord 25 and secured thereto.

All these joining operations between the nose and intermediate or central section subassemblies may be readily carried out through spot welding operations by reaching in from the open rear end between the top and bottom skin blankets 32 and 33 of the central section subassembly.

If the top and bottom subassemblies $B^1$ and $B^2$ of the central section of the airfoil had not been preassembled prior to the final assembly operations just described, they are at this time also joined together through their overlapping rib web parts 44a and 44b and the similarly overlapping vertical reinforcements 45a and 45b. The rear strut 46 is also at this time joined in the overlap between it and the bottom web part 44b and the bottom gusset 47. All these joining operations would then also take place by reaching in from the rear.

It may, however, be desirable to preassemble the two subassemblies $B^1$ and $B^2$ in a separate jig prior to final assembly of the central section with the nose subassembly and, in fact, this may be preferred, since at such time the front as well as the rear space between the top and bottom skin blankets is open, and joining of these subassemblies may, therefore, be proceeded with simultaneously from both the front and rear of the central section of the airfoil.

After the subassemblies A and B have been assembled as described, the trailing edge subassembly is brought into place for final assembly from the spaced position shown in Fig. 9 to the final assembly position shown in Fig. 10. In this latter position the rearwardly projecting final assembly joint parts of the spar chord angles 54 telescope within the adjacent reinforced rearwardly projecting margins of the respective top and bottom skin sheets 35 and are readily secured thereto by spot welding. At the same time, the vertically reinforced regions of the spar 48 at the locations of the vertical stiffening angles 57 associated with the main trailing edge ribs 49 are brought into overlapping relation with the respective aligned rib stiffening strut angles 46 as shown in Figs. 10, 11, 12 and 13, and the overlapping reinforced final assembly joint parts are strongly joined together by a series of closely spaced bolts as 66, extending the full height of the airfoil structure.

To facilitate this joinder and allow it to be made entirely from the open rear side of the spar 48, the nuts cooperating with the bolts 66 are preferably welded or otherwise secured to the reinforced vertical struts 46 prior to final assembly, and the holes receiving the bolts are similarly drilled prior to final assembly, so that all that remains to be done in final assembly is to insert the bolts from the rear open side of the spar and screw them home. Suitable locking means, not shown, to prevent loosening of the bolts will obviously be provided. Such locking means is now commonly provided by means embodied in the nuts themselves.

The main structural parts of the wing panel having now been assembled, all that remains to complete the panel is to apply the fabric covering 67 to the trailing edge portion. This is accomplished at the top by securing a looped front margin of the fabric in depressed portion of the attaching strip 56 by clamping the fabric, as clearly shown in Fig. 14, to this depressed portion by a channeled clamping strip 68 secured in place by screws 69. After such securement, the edge of the fabric is looped over and secured to the main body of the fabric as shown. The arrangement is such as to bring the outside fabric covering substantially in streamline continuation of the top skin sheet 35. The fabric covering is then stretched over the marginal member 65 and secured to its under face in a manner similar to the securement of its front end, as shown in Fig. 15.

The bottom fabric covering 67 is similarly secured at the front and its rear connection, not shown, at the forward margin of the flap recess may be similar to the other connections.

While the specific subassembly division and construction of the improved airfoil and the method of assembly shown and described herein have proved highly efficient and calculated to facilitate the construction and fabrication of the stressed skin type of airfoil, it will be understood that changes and modifications may be made by those skilled in the art without departing from the main features of the invention, and such changes and modifications are intended to be included within the scope of the appended claims.

What is claimed is:

1. The method of fabricating an interiorly-framed skin-covered structure which is too small for the entrance of a workman's body, such for example as an airfoil or the like, which comprises, forming a skin-covered frame-supported leading edge sub-assembly which has frame connections accessible from the rear, forming a skin-covered frame-supported central section sub-assembly of laterally spaced ribs and skin blankets secured on the ribs which is covered on both sides and open completely between ribs and skin blankets interiorly through the rear to the front, and securing the framing of the leading edge and central section sub-assemblies together interiorly of the covering skins by working inside between the ribs and skin blankets through the central section from the rear.

2. The method of fabricating an interiorly-framed skin-covered structure which is too small for the entrance of a workman's body, such for example as an airfoil or the like, which comprises, forming a skin-covered frame-supported leading edge section with inter-skin frame joint surfaces extending from front to rear and accessible from the rear, forming a skin-covered frame-supported central section subassembly of laterally spaced ribs and skin blankets secured on the ribs which is covered on both sides and completely between the ribs and skin blankets interiorly through the rear to the front and includes frame joint surfaces in side-engaging relation with the joint surfaces of the leading edge, and securing the framing of the leading edge and central section sub-assemblies together interiorly of the covering skins by making shear connections between the overlapping frame parts working inside between the ribs and skin blankets through the central section from the rear.

3. The method of fabricating an interiorly-framed skin-covered structure which is too small for the entrance of a workman's body, such for example as an airfoil or the like, which comprises, forming a skin-covered frame-supported leading edge section with inter-skin frame joint surfaces extending from front to rear and accessible from the rear, forming a bipartite skin-covered frame-supported central section sub-assembly of laterally spaced ribs and skin blankets secured on the ribs which is covered on both sides and open completely between the ribs and skin blankets through the rear to the front and which includes frame joint surfaces in side-engaging relation with each other intermediate their skin coverings and in side-engaging relation with the joint surfaces of the leading edge, and securing the framing of the leading edge and central section sub-assemblies together interiorly of the covering skins by making shear connections between the overlapping frame parts working inside between the ribs and skin blankets through the central section from the rear.

4. The method of fabricating an interiorly-framed skin-covered structure which is too small for the entrance of a workman's body, such for example as an airfoil or the like, which comprises, forming a skin-covered frame-supported leading edge sub-assembly which is open interiorly at the rear, forming a skin-covered frame-supported central section sub-assembly of laterally spaced ribs and skin blankets secured on the ribs which is covered on both sides and open completely between ribs and skin blankets interiorly through the rear to the front, securing the framing of the leading edge and central section sub-assemblies together interiorly of the covering skins by working inside between the ribs and skin blankets through the central section from the rear, and securing a closing structure to the rear of the central section by working behind the closing structure.

5. The method of fabricating an interiorly-framed skin-covered structure which is too small for the entrance of a workman's body, such for example as an airfoil or the like, which comprises, forming a skin-covered frame-supported leading edge sub-assembly which is open at the rear, forming a skin-covered frame-supported central section sub-assembly of laterally spaced ribs and skin blankets secured on the ribs which is covered on both sides and open completely between ribs and skin blankets interiorly through the rear to the front, forming a trailing edge sub-assembly of spar and uncovered ribs, securing the framing of the leading edge and central section sub-assemblies together interiorly of the covering skin by working inside between the ribs and skin blankets through the central section from the rear, securing the spar to the rear of the central section by working behind the spar inside the trailing edge section, and finally securing a covering skin over the trailing edge section.

MICHAEL WATTER.

REFERENCES CITED

The following references are of record in the file of this patent:

UNITED STATES PATENTS

| Number | Name | Date |
|---|---|---|
| 1,271,386 | Tarbox | July 2, 1918 |
| 1,427,447 | Dornier | Aug. 29, 1922 |
| 1,559,807 | Thaden | Nov. 3, 1925 |
| 1,579,906 | Zimmermann et al. | Apr. 6, 1926 |
| 1,781,723 | Fox | Nov. 18, 1930 |
| 1,784,501 | Staiger | Dec. 9, 1930 |
| 1,823,699 | Norton et al. | Sept. 15, 1931 |
| 1,854,330 | Delage | Apr. 19, 1932 |
| 1,877,022 | Northrop | Sept. 13, 1932 |
| 2,087,626 | Minshall | July 20, 1937 |
| 2,275,038 | Whitesell, Jr. | Mar. 3, 1942 |

FOREIGN PATENTS

| Number | Country | Date |
|---|---|---|
| 303,360 | Great Britain | Sept. 13, 1932 |
| 315,793 | Great Britain | July 16, 1929 |

Certificate of Correction

Patent No. 2,451,454.　　　　　　　　　　　　　　　　　　　October 12, 1948.

MICHAEL WATTER

It is hereby certified that error appears in the printed specification of the above numbered patent requiring correction as follows:

Column 9, line 48, claim 2, before the word "completely" insert *open*; and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.*